March 26, 1957 K. R. HOYT 2,786,386
MULTI-FRAME FILMS AND METHOD OF PRODUCTION
Filed March 25, 1952

INVENTOR.
Karl Robert Hoyt
BY
Stedman B. Hoar
Agent

United States Patent Office
2,786,386
Patented Mar. 26, 1957

2,786,386

MULTI-FRAME FILMS AND METHOD OF PRODUCTION

Karl Robert Hoyt, Newport Beach, Calif., assignor of twenty-five percent to Stedman B. Hoar, Balboa, Calif.

Application March 25, 1952, Serial No. 278,375

9 Claims. (Cl. 88—24)

This invention relates to multi-frame films, such as are commonly used for moving pictures, and to a method of impressing pictorial information on such films so as to render them suitable and available for purposes for which present films are not adapted. More specifically and particularly in relation to an important feature of my invention, my invention relates to a method of printing one film from another film so as to convey not only ordinary monochromatic pictorial information but also color information between films which are intended for projection in different arts having different standards of frame-frequencies, and one of the principal features of the invention is that my novel printing method is reversible so that a film intended for projection at either a fast or a slow rate of frame-frequency may be a product of the printing method.

It may be here stated that when I refer to the art of optical printing I refer in general to the well-known art by which pictures are duplicated from a master film and that by positive film and negative film I means respectively the film from which the duplication is made and the film upon which it is made; and the terms are intended to include all feasible ramifications of the duplicating art and of the films as defined by the direction of transfer regardless of the degree of development of the respective films. Color information herein refers to any informatory quality of a film from which color may be reproduced, either actual color or gradations of monochromatic brilliance created by filter color separation and capable of chromatic restoration by filtered color addition. The term action sequence is used to denote a sequence of film frames in relation to the depiction of form, as distinct from color, although an action sequence as so defined may also carry color information and may show a still scene.

At the present time, television broadcasting of colored motion pictures, if attempted at all, is limited to black and white reproduction at the television receiver and results in reception of poor definition, because in the television process picture areas of different hues, which would be differentiated in the color photographic process may transmit or reflect equal total light and therefore blend. This is particularly true for picture areas of unsaturated color and is unfortunate because a large proportion of the so-called A pictures in storage are color pictures and the fare of the television audience is necessarily largely limited to B pictures.

In the production of color motion pictures by present techniques there are annoying delays in obtaining test showings, technically called rushes, due to the length of time required to develop a film in color by any of the three-color processes, and often the cast of a picture must be held together an unduly long time to determine whether retakes are required; perhaps under expensive conditions on location. Monochromatic film, on the other hand, may be quickly developed and tested. By photographing an ordinary black and white film, but with color information impressed thereon, many economies may be effected, developed film for rushes may be made quickly available, and the film may be used for a variety of purposes.

It is an object of my invention to provide a method of registering and transferring pictorial information by which films may be furnished to the television industry which will have superior clarity and definition when broadcast, and by which, the information on a film adapted for use in television and meeting the specifications of my system may be transferred to a film adapted to projection in motion picture theaters.

A further object of my invention is to provide a method of registering and transferring color information from a colored film to a monochromatic film or from a monochromatic film having color separation to a film of Kodachrome type, so that the monochromatic film may be broadcast with standard television technique as a television picture capable of reception in color, and the Kodachrome type film may be projected with standard motion picture technique.

More specifically, in connection with the foregoing, it is an object of my invention to provide a monochromatic film which may be broadcast on television without change in present standard apparatus or technique and which will then produce a colored picture on a receiver having suitable color-reception apparatus or a monochromatic picture of superior quality on a receiver not so equipped.

Another object of my invention is to provide a method of recording color information which permits inexpensive and easily developed monochromatic film to be used in photographing a scene which is to be the subject of picture projection in color, such film then serving economically as a test film for rushes, also as a medium for transfer of its color information to a colored motion picture film, and also as a subject to be broadcast directly by television and to be received either monochromatically or in color.

It is to be understood that while I herein describe my invention in terms of present standards of motion picture photography and projection and of television broadcasting, certain principles of the invention, hereinafter claimed, are applicable to changed standards in either or both of these methods of picture presentation. The standards of picture frequency now uniform throughout the United States are: twenty-four picture frames per second in the motion picture art, and thirty picture frames per second in the television art, these thirty frames being each divided into two interlaced fields, giving sixty television fields per second. While it is a leading object of my invention to make color available inexpensively in both arts without mechanical changes being required in motion picture theatres or electronic changes being required in television, still if changes in standards do develop in these arts—and it is conceivable that in television the development of ultra-high frequency bands may be accompanied by changes in frame and field frequency—certain principles of my invention will remain unchanged, and details of embodying the invention may be varied to suit new conditions.

Furthermore, although I herein describe my invention in terms of certain primary color combinations and sequential arrangements which I have previously disclosed in my copending application Serial No. 237,790, filed July 20, 1951, now Patent No. 2,703,340, which combinations and arrangements are well suited to television pick-up and receiving apparatus as at present manufactured, yet should changes in manufacturing techniques render other color combinations and arrangements possible or more desirable, the principles of my invention are deemed sufficiently broad to encompass such changes.

In broad terms, my invention comprises the use of various sequences and sub-sequences of film frames in the reception of, and transfer of, pictorial information of action and/or color, these sequences and sub-sequences being numerically related to the frame and field frequencies of television, and to the frame frequency of the motion picture art. To provide a color sequence which may be repetitively applied, a number equal to twice the number of fields in a television frame is chosen, this number in current standard television practice being four. The numerical value of the color sequence is also applied as the numerical value of a sequence of frames of a motion picture film, to or from which pictorial information is to be transferred. This sequence of frames of a motion picture film may be termed both an action sequence and a color sequence, as it controls the transfer of information in both respects. The quotient of the frame-frequency of a motion-picture film divided by the numerical value of the color sequence is then taken as a factor by which the relative field frequency of television is divided to determine the numerical value of an action sequence for the film which is to be used in television. As the relative frame-frequency of motion pictures and field-frequency of television are currently respectively twenty-four and sixty, the quotient factor referred to above is seen to be currently six and the numerical value of the action sequence of the television film is seen to be ten.

To apply color sequences and action sequences one against the other, I divide the color sequence into color sub-sequences each numerically equal to the number of fields in a television frame, and I divide the television film action sequence into a number of action sub-sequences equal to the number of frames in a color sequence, with the minimum number of frames in an action sub-sequence equal to the number of frames in a color sub-sequence and with extra frames of the television film action sequence being applied to one or more frames of the color sequence but preferably so that the greatest number of frames in an action sub-sequence is not more than twice the number of frames in a color sub-sequence. Currently the number of frames in a color sub-sequence will be two, applicable alternately to the two interlaced fields of standard television. The ten frames of an action sequence will be divided into four sub-sequences, each of a minimum of two frames. The two extra frames of the action sequence may be applied either individually to two frames of a four-frame action (or color) sequence or collectively to one frame thereof.

Thus I may apply action information to a monochromatic film at the television field frequency rate—that is, at sixty frames per second—and to such a film I may apply color information in a sequence of four frames, which may have one color repeating in alternate frames. Such a film may be shown on television; the color repetition, if present, will run in one field, and complementary color will occur in the other field. No special equipment is required to broadcast such a film but broadcasts by a standard television camera may be received in color by a suitably equipped receiver, and monochromatically by a receiver lacking such equipment. Such a film may be projected through additive color means and viewed as a motion picture, for example for "rushes." It may have its color information transferred to a color film such as Kodachrome by optical printing through a color filter of four-sector color sequence and two-color sub-sequence, each action sub-sequence of the monochromatic film being printed on one frame of the Kodachrome film, the filter being advanced synchronously with the monochromatic film so that each frame of the Kodachrome film also receives the color information of at least one color sub-sequence.

By reason of utilization of the aforesaid sequences and sub-sequences the printing transfer process becomes reversible. Whereas the monochromatic film may receive action and color information from a live scene by photographic process through a color-subtracting filter, it may also have action information printed on it from a standard motion picture film, or if the standard film be colored both action and color information may be transferred therefrom. The action-sequence of four frames of the standard film may be printed on four action sub-sequences forming a ten-frame action sequence of the monochromatic film; and by a filter of a four-sector sequence divided into color sub-sequences of two sectors each and maintained in sector-frame synchronization with the monochromatic film, the color information of each frame of the standard film may be applied to each action sub-sequence of the monochromatic film.

In the accompanying drawing, illustrative of the application of my invention to films of the relative frequencies now standard in the motion picture and television arts:

Figures 1, 2, 3, 4, 5, 6, 7:
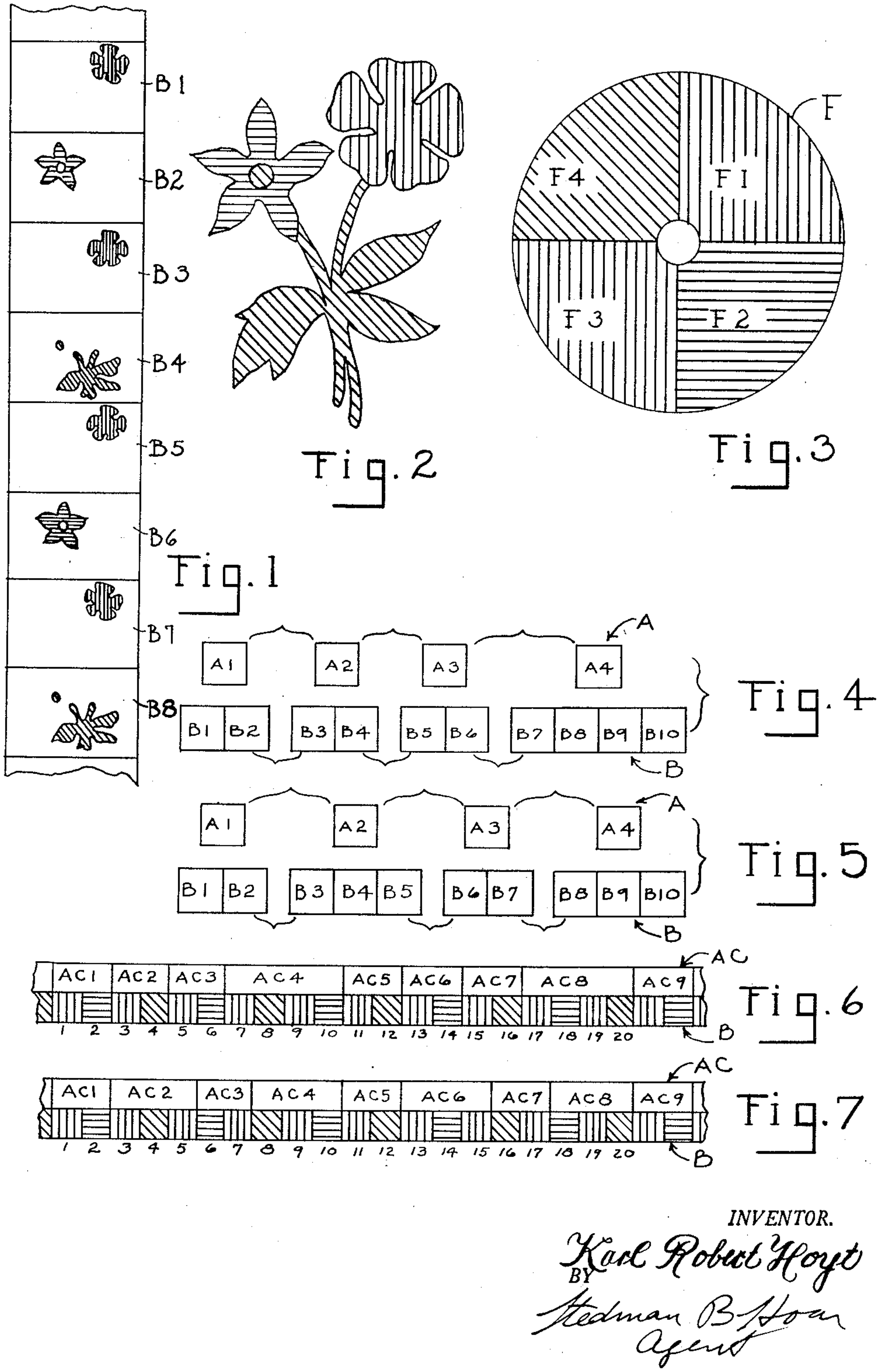
Fig. 1 is a schematic view of a fragment of monochromatic film (negative) showing the application thereto of color information as it would occur if Fig. 2 was photographed thereon through the filter of Fig. 3, or if a colored film carrying the picture of Fig. 2 was printed thereon through such a filter.
Fig. 2 shows in enlargement red and blue flowers with green leaves, which might be the source of color information.
Fig. 3 shows a preferred color field sequence as it might appear on a disk-type filter suitable for use in either color segregation or color addition.
Fig. 4 illustrates schematically one method of transferring an action sequence between films respectively of standard motion picture and television frame frequency.
Fig. 5 illustrates schematically another method transferring an action sequence between such films.
Fig. 6 illustrates by printers' conventional symbols how color information is transferred between films in the action sequence of Fig. 4.
Fig. 7 similarly shows the transfer of color information between films in the action sequence of Fig. 5.

Having reference to the drawing, I will first describe my method of preparing a film for broadcasting on television. Such a film may be prepared either by photographing a "live" scene or by optical printing from a standard motion picture film. Optical printing mechanisms for making reprints of a film are so well understood by those engaged in the motion picture art that no detailed description is believed necessary beyond mention that, as usually operated, a master film, called the positive, is run through a printer synchronously with a second film, called the negative, the rates of advancement being equal and both films being stopped momentarily, frame by frame, at a printing station to print the picture of the positive upon the negative. In the present invention, when a standard motion picture film, shown at A in Figs. 4 and 5, is to be printed as a positive upon a film B, which is to be used in television, a sequence of four frames of the A film are printed on a sequence of ten frames of the B film. It will be observed that four and ten are the respective quotients of twenty-four and sixty divided by the common factor of six, which is the quotient of twenty-four divided by twice the number of fields in a television frame, namely four.

Preferably the four sub-sequences into which the B film is divided have a 2–2–2–4 frame arrangement, as shown in Fig. 4. Frame A1 is printed successively on frames B1 and B2; frame A2 is printed successively on frames B3 and B4; frame A3 is printed successively on frames B5 and B6; and frame A4 is printed successively on frames B7, B8, B9, and B10. The arrangement has the advantage that not only are the A frames not divided between action sub-sequences of the B film, but are applied integrally thereto, but also the action sub-sequences consist of integral numbers of television frames, when the B film is broadcast, and of integral numbers of color sub-sequences if color is used. Alternatively, and the disadvantage is slight if the action is not too rapid or the colors too brilliant, the sub-sequences of the B film may have a 2–3–2–3 frame arrangement as shown in Fig. 5. In this case, frame A1 is printed successively on Frames B1 and B2; frame A2 is printed successively on frames B3, B4, and B5; and the cycle is repeated with frames A3 and A4 being printed respectively successively on frames B6 and 7, and frames B8, 9, and 10.

Now if color information is to be applied to film B, either directly photographically or by printing from a colored film AC, the live scene may be photographed through a filter F, or the filter F may be interposed at the optical printing station between the film AC and the film B. In either case the filter F is advanced synchronously with the film B, successive sectors of the filter F being registered with successive frames of the film B. As shown in Fig. 3, the filter F has a three color, four-sector sequence as described in my hereinbefore mentioned application Serial No. 237,790, but other sequences of four sectors may be used. If filter F is rotated to bring section F1, F2, F3 and F4 successively in register with frames B1, B2, B3, B4, and then successively in register with frames B5, B6, B7, B8, and so continuing cyclically, the red color information of frame AC1 will be transferred to frame B1, the blue information of frame AC1 will be transferred to frame B2, the red information of frame AC2 will be transferred to frame B3 and the green information of frame AC2 will be transferred to frame B4 as illustrated in Fig. 6. In the repetition of the color sequence, frames A5 and B6 will respectively receive red and blue information from frame AC3, and then frames B7, B8, B9 and B10 will respectively receive red, green, red, and blue information from frame AC4. This completes the application of a four frame action sequence and a four sector color sequence to a ten-frame action sequence.

In the next cyclic application of sequences to a ten-frame action sequence, the order of the color sub-sequences red-blue, red-green, is reversed, and is reversed again to the original order beginning with the third ten-frame action sequence. The relative order of the color sub-sequences, or indeed of the colors within a sub-sequence is of no consequence, the concomitance of the filter sectors in their ordinal sequence 1, 2, 3, 4 whatever their coloration, with the successive frames of the B film being the only requisite.

If the arrangement of the action sequences is the 2, 3, 2, 3 arrangement of action sub-sequences heretofore described, and shown in Fig. 5, the application of color information to film B will be precisely the same as just described as regards the order of color on individual frames of film B, but will have the relationship to the action sub-sequences of film B shown in Fig. 7. It will be seen that the third color sub-sequence will be split between frames B5 and B6, occurring respectively in the second and third action sub-sequences, and the fourth color sub-sequence will be split between frames B7 and B8, occurring respectively in the third and fourth action sub-sequences. However, each ten-frame action sequence begins and ends in the same color arrangement as the corresponding sequences shown in Fig. 6.

The effect on film B, either photographically or by printing is shown in Fig. 1. If the color arrangement shown in Fig. 2 was impressed on film B through filter F of Fig. 3, consecutive frames of film B would receive color information in sequences of four and in sub-sequences of two frames. The odd numbered frames are shown as receiving information of red color and the even-numbered frames are shown receiving information of blue and green color in alternation. If film B, so arranged, was scanned by a present standard television camera at 60 frames per second, the odd-numbered frames would appear in one field on a television receiver, and the even-numbered frames would appear on the other interlaced field. If the reception were viewed through a filter F in color synchronization with the received fields, the subject Fig. 2 would appear in natural color; without color-additive means at the receiver, the reception would be monochromatic but of better than ordinary definition.

It will be noted that color reception is accomplished by scanning a monochromatic film with a standard camera lacking any means of color segregation or identification whatsoever.

In the reversal of my method of action and color transfer between films, that is, transfer from a 60-frame per second B film to a 24-frame per second A frame, exactly the same technique is used. A monochromatic B film on which a scene has been photographed at 60 frames per second is divided into ten-frame action sequences, and then into four action sub-sequences, which appear as (B1, B2) (B3, B4) (B5, B6) and (B7, B8, B9, B10) in Fig. 4, or as (B1, B2) (B3, B4, B5) (B6, B7) and (B8, B9, B10) in Fig. 5. These sub-sequences are printed respectively on individual frames A1, A2, A3, and A4, all the frames of each sub-sequence being printed on each respective A frame.

If during the photographing of film B a color filter F was used to register separated color information as shown in Fig. 1, this information may be transferred to film AC if the latter is of the Kodachrome type by interposition of a filter F between the films at the optical printing station. As previously described the filter F is advanced by one sector for each frame of the B film, and in color synchronization with the color information of the B film. If the arrangement of Figs. 4 and 6 is utilized, frame AC1 receives red and blue information converted by the filter F into red and blue light which energizes the red and blue responsive emulsions of the Kodachrome. Frame AC2 will correspondingly be energized by red and green light, frame AC3 by red and blue light, and frame AC4 by red, blue, and green light, the red energization occurring twice.

If the arrangement of Figs. 5 and 7 is utilized, frame AC1 receives red and blue energization, frame AC2 receives red, green, and red; frame AC3 receives blue and red; and frame AC4 receives blue, red, and green. In either case, three frames out of four in each AC film sequence receive two colors and the fourth receives all three colors. Because of the rapid alternation of color, with a maximum interval of color reappearance of one-twelfth of a second, very good color results are obtained.

For the purpose of viewing "rushes," it is not necessary to print and develop the AC film. The B film projected through a filter F will give complete information of color and composition, from which the quality of the Kodachrome film when the latter is subsequently developed may be determined in advance.

Having now described my new monochromatic film for television broadcasting and other purposes, and the reversible process by which that film and a colored film for motion picture projection may be made one from the other, I desire the scope of my invention to be considered as not limited to the exact details herein illustrated by way of example but as broadly including such variations of those details as may fairly come within the scope and spirit of the appended claims.

I claim:

1. In optically printing a negative multi-frame film from a positive multi-frame film carrying color information when one of said films depicts in twenty-four frames the action which the other of said films depicts in sixty frames, the printing method which comprises: advancing both of said films intermittently through the printing station of an optical printer so as to stop said films at said station in frame-to-frame register, and at such relative rates that at least two frames of said other film are registered successively with each frame of said one film and that ten frames of said other film are registered for each four frames of said one film, the frames of said other film in excess of two for each of said one film being so applied that no two adjacent frames of said one film are individually registered with more than two frames of said other film; interposing between said films at said station a color filter having a cyclic arrangement of four color sections, of which alternate sections are representative of one portion of the spectrum and the intervening sections are representative of two colors jointly complementary to said alternate sections, and registering said filter with said other film so as to register successive color sections of said filter with successive frames of said other film; and printing the frames of the negative film from the concomitantly registered frames of the positive film through the concomitantly registered filter sections while said films and said filter are stopped at said station.

2. In optically printing a negative multi-frame film from a positive multi-frame film carrying color information when one of said films, herein called the slow film, depicts in twenty-four frames the action which the other of said films, herein called the fast film, depicts in sixty frames, the printing method which comprises: advancing both of said films through an optical printer intermittently and at different rates of intermittent movement so as to bring a sequence of ten frames of said fast film into successive register with a sequence of four frames of said slow film at a printing station of said printer, two frames of said fast film being consecutively registered with each frame of said slow film until six frames of said fast film and three frames of said slow film have been so registered and the remaining four frames of said ten-frame sequence being consecutively registered with the fourth frame of said four frame sequence; interposing between said films at said station a color filter having a cyclic arrangement of four color sections of which two alternate sections are representative of color of one portion of the spectrum and the two other sections are of different colors jointly complementary in color to said alternate sections, and registering consecutive sections of said filter with consecutive frames of said fast film in the order of the color information which is to be transferred from said positive film to said negative film; and printing each of said positive film frames upon each negative film frame registered therewith through the then concomitantly registered filter section.

3. In optically printing a negative multi-frame film from a positive multi-frame film carrying color information when one of said films, herein called the slow film, depicts in twenty-four frames the action which the other of said films, herein called the fast film, depicts in sixty frames, the printing method which comprises: advancing both of said films through an optical printer intermittently and at different rates of intermittent movement so as to bring a sequence of ten frames of said fast film into successive register with a sequence of four frames of said slow film at a printing station of said printer, two frames of said fast film being consecutively registered with each of two alternate frames of said slow film, and three frames of said fast film being consecutively registered with each of the remaining frames of the four-frame sequence of said slow film; interposing between said films at said station a color filter having a cyclic arrangement of four color sections of which two alternate sections are representative of color of one portion of the spectrum and the two other sections are of different colors jointly complementary in color to said alternate sections, and registering consecutive sections of said filter with consecutive frames of said fast film in the order of the color information which is to be transferred from said positive film to said negative film; and printing each of said positive frames upon each negative film frame registered therewith through the then concomitantly registered filter section.

4. In optically printing a negative multi-frame film from a colored positive multi-frame film so that said negative film depicts in sixty frame the action depicted by said positive film in twenty-four frames and receives reproducible color information from said positive film, the printing method which comprises: advancing both of said films through an optical printer to bring successive frames of each into register with a printing station of said printer at which there is interposed between said films a color filter having a cyclic arrangement of four color sections of complementary colors; printing a first frame of said positive film upon a first frame of said negative film through a first ordinal section of said filter; printing said first frame of said positive film upon a second frame of said negative film through the second ordinal section of said filter; printing a second frame of said positive film upon a third frame and then on a fourth frame of said negative film and respectively through the third and the fourth ordinal sections of said filter; printing a third frame of said positive film on a fifth frame and then on a sixth frame of said negative film, and respectively through the first and second ordinal sections of said filter; printing a fourth frame of said positive film consecutively on a seventh, eighth, ninth, and tenth frame of said negative film and respectively through the third, fourth, first and second ordinal sections of said filter; and cyclically repeating the foregoing printing steps with respect to successive groups of four positive frames and ten negative frames, the interposition of said filter beginning with the third ordinal section thereof for the next succeeding group of film frames and changing by one ordinal section for each successive individual negative frame.

5. In optically printing a negative multi-frame film from a colored positive multi-frame film so that said negative film depicts in sixty frames the action depicted by said positive film in twenty-four frames and receives reproducible color information from said positive film, the printing method which comprises: advancing both of said films through an optical printer to bring successive frames of each into register with a printing station of said printer at which there is interposed between said films a color filter having a cyclic arrangement of four color sections of complementary colors; printing a first frame of said positive film upon a first frame of said negative film through a first ordinal section of said filter; printing said first frame of said positive film upon a second frame of said negative film through the second ordinal section of said filter; printing a second frame of said positive film upon a third frame, a fourth frame, and a fifth frame of said negative film and respectively through the third, fourth, and first ordinal sections of said filter; and cyclically repeating the foregoing printing steps with respect to successive groups of two positive frames and five negative frames, the interposition of said filter beginning with the second ordinal section thereof for the next succeeding group of film frames and changing by one ordinal section for each successive negative frame.

6. In optically printing a negative multi-frame film from a colored positive multi-frame film, so that said negative film depicts in sixty frames the action depicted by said positive film in twenty-four frames and receives reproducible color information from said positive film, the printing method which comprises: advancing both of said films through an optical printer to bring successive frames of each into register with a printing station of said printer at which there is interposed between said film a color filter having a cyclic arrangement of four sections in which alternate sections are red and one of the interleaved sections is blue and the other thereof is green; said films being advanced intermittently at different rates of movement by which ten sequential frames of said negative film are successively registered with a sequence of four frames of said positive film, not less than two nor more than four frames of said negative film being consecutively registered with each frame of said positive film; concomitantly registering said filter section with the registered frames of said negative film; and printing each frame of said positive film upon each frame of said negative film registered therewith through the then concomitantly registered filter section so that the red color of each frame of said positive film is printed as reproducible color information on alternate frames of said negative film and the green and blue colors of said positive film are printed as reproducible color information respectively on alternate frames of said negative film interleaved with said red-receiving negative frames.

7. In the art of optically printing films, the method set forth in claim 6, in which two frames of said negative film are consecutively registered with each frame of said positive film until six frames of said negative film and three frames of said positive film have been so registered, and the remaining four frames of said ten-frame sequence are consecutively registered with the remaining frame of the four-frame sequence of said positive film.

8. In the art of optically printing films, the method set forth in claim 6, in which two frames of said negative film are consecutively registered with each of two alternate frames of said positive film, and three frames of said negative film are consecutively registered with each of the remaining frames of the four-frame sequence of said positive film.

9. A multi-frame film or like frame-divided recording of pictorial information having color information reproducible by additive means, and varying from frame to frame, no two consecutive frames bearing like color information, arranged cyclically in sequences of four frames, alternate frames carrying information of one color and the interleaved frames alternately carrying information of two other colors jointly complementary to said one color and each five consecutive sequences of said sequences of four frames being arranged in action-depicting groups of 2, 2, 2, 4, 2, 2, 2, 4 frames each, each group of frames depicting identical action.

References Cited in the file of this patent

UNITED STATES PATENTS

| | | |
|---|---|---|
| 1,402,668 | Shaw | Jan. 3, 1922 |
| 1,700,616 | Thornton | Jan. 29, 1929 |
| 2,084,353 | McNett | June 22, 1937 |
| 2,144,457 | Horst | Jan. 17, 1939 |
| 2,168,041 | O'Grady | Aug. 1, 1939 |
| 2,303,960 | Seeley | Dec. 1, 1942 |
| 2,415,390 | Konkle | Feb. 4, 1947 |
| 2,517,250 | Shea | Aug. 1, 1950 |
| 2,539,498 | Waller | Jan. 30, 1951 |
| 2,661,652 | Evans | Dec. 8, 1953 |